(12) United States Patent
Mubarek et al.

(10) Patent No.: US 12,175,397 B2
(45) Date of Patent: Dec. 24, 2024

(54) METHOD AND APPARATUS FOR USING PEDESTRIAN PROBE DATA FOR RIDESHARING SERVICES

(71) Applicant: HERE Global B.V., Eindhoven (NL)

(72) Inventors: Ömer Mubarek, Chicago, IL (US); James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 239 days.

(21) Appl. No.: 17/369,599

(22) Filed: Jul. 7, 2021

(65) Prior Publication Data

US 2022/0012656 A1    Jan. 13, 2022

Related U.S. Application Data

(60) Provisional application No. 63/049,464, filed on Jul. 8, 2020.

(51) Int. Cl.
*G06Q 10/0631* (2023.01)
*G06F 16/909* (2019.01)
*G06Q 50/40* (2024.01)

(52) U.S. Cl.
CPC ..... *G06Q 10/06311* (2013.01); *G06F 16/909* (2019.01); *G06Q 50/40* (2024.01)

(58) Field of Classification Search
CPC ............ G01C 21/32; G01C 21/3492; G01C 21/3415; G01C 21/28; G01C 21/30;
(Continued)

(56) References Cited

U.S. PATENT DOCUMENTS 9,103,689 B1   8/2015  Rinckes et al.

9,953,539 B1   4/2018  Gkiotsalitis et al.
2015/0300835 A1* 10/2015  Fowe ............... G08G 1/012
                                                        701/410

FOREIGN PATENT DOCUMENTS

| CN | 111866725 A | * | 10/2020 | ............ G01S 11/06 |
| JP | 2020004225 A | * | 1/2020 | ............ G06Q 30/02 |
| WO | WO-2019110584 A1 | * | 6/2019 | ............ G06Q 50/30 |

OTHER PUBLICATIONS

L. Tang, et al. "Recommendation for Ridesharing Groups Through Destination Prediction on Trajectory Data," IEEE Transactions on Intelligent Transportation Systems, vol. 22, No. 2, pp. 1320-1333. <https://ieeexplore.ieee.org/document/8944004?source=IQplus> (Year: 2019).*

(Continued)

*Primary Examiner* — Jerry O'Connor
*Assistant Examiner* — Michael R Koester
(74) *Attorney, Agent, or Firm* — DITTHAVONG, STEINER & MLOTKOWSKI

(57) ABSTRACT

An approach is provided for using pedestrian probe data for ridesharing. The approach involves, for example, receiving pedestrian probe data from a search zone associated with a designated location. The pedestrian probe data is collected, for instance, from one or more location sensors of at least one device associated with at least one pedestrian. The approach also involves processing the pedestrian probe data to determine one or more pedestrian paths terminating at the designated location. The approach further involves identifying at least one common origin, at least one common destination, or a combination thereof of the one or more pedestrian paths and providing the least one common origin, the at least one common destination, or a combination thereof as an output.

15 Claims, 14 Drawing Sheets

(58) Field of Classification Search
CPC .. G01C 21/3461; G01C 21/34; G08G 1/0112; G06Q 10/06311
See application file for complete search history.

(56) References Cited

OTHER PUBLICATIONS

Bryant Jr., "Finding the Optimal Locations for Bike Sharing Stations: a Case Study Within the City of Richmond, Virginia", 2013, retrieved on Jul. 8, 2020 from https://pdfs.semanticscholar.org/e27b/efbe70a20d54f83803c35ee1fc97805eca1b.pdf, 87 pages.

Shu et al., "Determining the Exact Location of a Public Bicycle Station's the Optimal Distance Between the Building Entrance/exit and the Station", Research Article, Feb. 20, 2019, retrieved on Jul. 8, 2020 from https://journals.plos.org/plosone/article?id=10.1371/journal.pone.0212478, pp. 1-10.

\* cited by examiner

METHOD AND APPARATUS FOR USING PEDESTRIAN PROBE DATA FOR RIDESHARING SERVICES

RELATED APPLICATION

This application claims priority to U.S. Provisional Patent Application Ser. No. 63/049,464, filed Jul. 8, 2020, entitled "METHOD AND APPARATUS FOR USING PEDESTRIAN PROBE DATA FOR RIDESHARING SERVICES," which is incorporated herein by reference in its entirety.

BACKGROUND

Ridesharing services (e.g., services in which is passenger is driven in a vehicle operated by another) are gaining widespread use. To meet the demand for ridesharing services, service providers often must decide and plan on how best to deploy or allocate ridesharing resources (e.g., ridesharing vehicles, service areas, etc.) across different geographic areas to efficiently meet the demand without underserving or overserving a given area. As a result, ridesharing service providers face significant technical challenges to automatically assessing the demand for ridesharing resources in a given geographic area.

SOME EXAMPLE EMBODIMENTS

Therefore, there is a need for an approach for using pedestrian probe data (e.g., comprising a time sequence of location data points traveled by a pedestrian) to provide ridesharing services.

According to one embodiment, a method comprises receiving pedestrian probe data from a search zone associated with a designated location. The pedestrian probe data, for instance, is collected from one or more location sensors of at least one device associated with at least one pedestrian. The method also comprises processing the pedestrian probe data to determine one or more pedestrian paths terminating at the designated location. The method further comprises identifying at least one common origin, at least one common destination, or a combination thereof of the one or more pedestrian paths. The method further comprises providing the least one common origin, the at least one common destination, or a combination thereof as an output. In one embodiment, the output is provided to a ridesharing service for determining one or more ridesharing locations or one or more ridesharing resource allocations.

According to another embodiment, an apparatus comprises at least one processor, and at least one memory including computer program code for one or more computer programs, the at least one memory and the computer program code configured to, with the at least one processor, cause, at least in part, the apparatus to receive pedestrian probe data from a search zone associated with a designated location. The pedestrian probe data, for instance, is collected from one or more location sensors of at least one device associated with at least one pedestrian. The apparatus is also caused to process the pedestrian probe data to determine one or more pedestrian paths terminating at the designated location. The apparatus is further caused to identify at least one common origin, at least one common destination, or a combination thereof of the one or more pedestrian paths. The method further comprises providing the least one common origin, at least one common destination, or a combination thereof as an output. In one embodiment, the output is provided to a ridesharing service for determining one or more ridesharing locations or one or more ridesharing resource allocations.

According to another embodiment, a computer-readable storage medium carries one or more sequences of one or more instructions which, when executed by one or more processors, cause, at least in part, an apparatus to receive pedestrian probe data from a search zone associated with a designated location. The pedestrian probe data, for instance, is collected from one or more location sensors of at least one device associated with at least one pedestrian. The apparatus is also caused to process the pedestrian probe data to determine one or more pedestrian paths terminating at the designated location. The apparatus is further caused to identify at least one common origin, at least one common destination, or a combination thereof of the one or more pedestrian paths. The method further comprises providing the least one common origin, the at least one common destination, or a combination thereof as an output. In one embodiment, the output is provided to a ridesharing service for determining one or more ridesharing locations or one or more ridesharing resource allocations.

According to another embodiment, an apparatus comprises means for receiving pedestrian probe data from a search zone associated with a designated location. The pedestrian probe data, for instance, is collected from one or more location sensors of at least one device associated with at least one pedestrian. The apparatus also comprises means for processing the pedestrian probe data to determine one or more pedestrian paths terminating at the designated location. The apparatus further comprises means for identifying at least one common origin, at least one common destination, or a combination thereof of the one or more pedestrian paths. The apparatus further comprises means for providing the least one common origin, the at least one common destination, or a combination thereof as an output. In one embodiment, the output is provided to a ridesharing service for determining one or more ridesharing locations or one or more ridesharing resource allocations.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for using pedestrian probe data for ridesharing services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
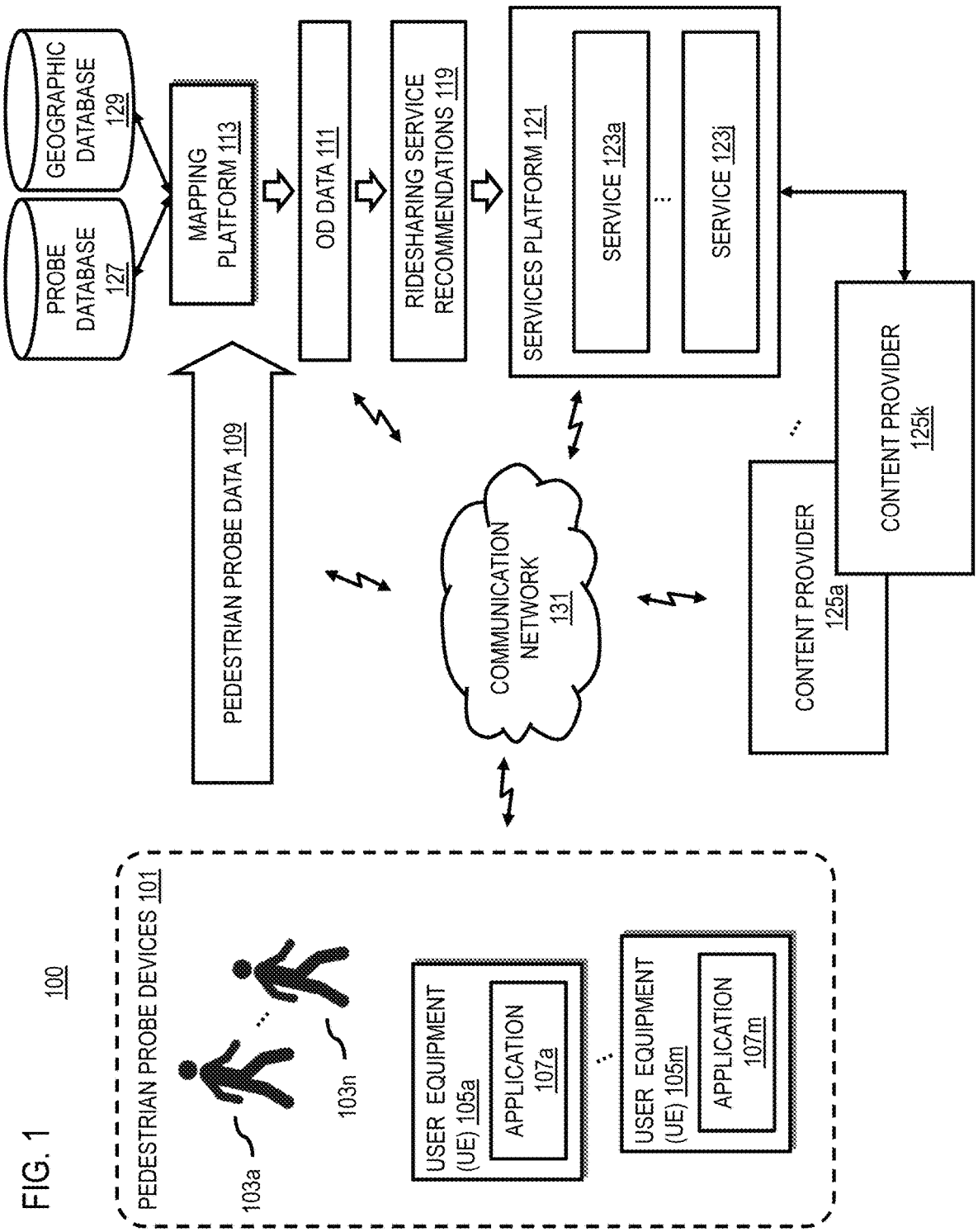
FIG. 1 is a diagram of a system for using pedestrian probe data for ridesharing services, according to example embodiment(s)

FIG. 1 is a diagram of a system for using pedestrian probe data for ridesharing services, according to example embodiment(s). Probes (e.g., location data points represented, for instance, as <latitude, longitude, timestamp> along with an probe identifier and possibly other information such as but not limited to speed, heading, etc.) collected using Global Positioning Satellite (GPS) receivers or equivalent location sensors are used for a variety of purpose such as: allowing a user to track themselves on a map, while driving, biking, running, etc. or to locate themselves while stationary. Other main usages of probe data are derived from analyzing and/or aggregating many probes over a large sample set, a particular time interval, and/or a particular distance. The results of this analysis can be used in predicting live traffic, traffic incidents on the road, or simply producing traffic patterns and other analytics over a given period of time. Historically, such analyses have mainly focused on vehicle probes.

A less explored field is pedestrian probes. Pedestrian probes can be relevant to transportation modes or services (e.g., ridesharing, ride hailing, and/or the like) that compete against or include pedestrian legs. As a result, service providers face significant technical challenges with respect to analyzing pedestrian probes to for location-based services. In one embodiment, pedestrian probes can be filtered out from non-pedestrian probes (e.g., vehicle and/or bike probes) and map matched. For example, as shown in FIG. 1, the system 100 can include pedestrian probe devices 101 associated with one or more pedestrians 103a-103n (also collectively referred to as pedestrians 103). The pedestrian probe devices 101, for instance, can include one or more user equipment (UE) devices 105a-105m (also collectively referred to as UEs 105 such as but not limited to smart phone devices, portable navigation devices, etc.) equipped with location sensors (not shown) and executing respective applications 107a-107m (also collectively referred to as applications 107). The UEs 105 can be carried by the pedestrians 103 to generate pedestrian probes (e.g., pedestrian probe data 109) as the pedestrians 103 travel.

In one embodiment, using this pedestrian probe data 101, the system 100 can generate paths for pedestrians. Then, these paths can be used to construct origin-destination (OD) matrix data 111 for pedestrians to represent the origin and destination of each detected path and the number of times each path with a particular origin and destination combination is observed in the collected pedestrian probe data 109.

In one embodiment, the system 100 (e.g., via a mapping platform 113) exploits the OD data 111 to optimize ridesharing services (and/or any other service relying on pedestrian OD data) for various mobility service providers (e.g., providers operating a services platform 121 and/or any of the services 123a-117j—also collectively referred to as services 123=of the services platform 121). This is achieved, for instance, by using clusters of pedestrian locations, directions of travel at various times of the day, and/or other pedestrian probe characteristics to guide the probabilistic path finding algorithm for ridesharing such that algorithm optimizes routes with increasing chances of getting an in-bound ridesharing request.

In other words, the mapping platform 113 analyzes pedestrian OD data 111 in aggregate over time and space to recommend ridesharing routes for a rideshare vehicle that are more likely to result in opportunities that generate more ride requests for rideshare companies (e.g., ridesharing service recommendations 119). By way of example, rideshare in this context covers ridesharing for bikes, scooters, cars, and/or other equivalent vehicles. Specifically, the system 100 can analyze pedestrian OD data 111 to provide ridesharing services with ridesharing service recommendations 119 that include, but are not limited to, optimum locations, routes, geographic areas, etc., where they can either focus their drivers and/or install their vehicle (e.g., bike, scooter, etc.) share stations. In one embodiment, the mapping platform 113 can focus on pedestrians who use public transportation who may need alternative mode of transportation, or can be applied more broadly to analyzing pedestrian need for ridesharing services with respect to any OD pair based on any designated location of interest (e.g., locations other than those related to public transportation).

For example, with respect to a public transportation use case, the system 100 can process the pedestrian probe data 109 to identify common routes for pedestrians walking, for instance, to a train, metro, bus, etc. stop and using this information to compute optimum locations, routes, areas, etc. for ridesharing services (e.g., bike, scooter, car, etc. rideshare companies) to allocate their resources (e.g., drivers, vehicles, etc.) and/or to build their service stations. In one embodiment, the mapping platform 113 analyzes pedestrian origin-destination (OD) data 111, such that ridesharing services (e.g., bike, scooter, car, etc. rideshare companies) can take advantage of new potential customers.

In one embodiment, the mapping platform 113 identifies locations of potential high demand (e.g., representing ridesharing service recommendations 119) such that ridesharing services can focus their resources to these locations. By way of example, ridesharing services can use these locations for the following purposes:

Ridesharing services can install ridesharing stations (e.g., bike, scooter, etc. stations), such that commuters can make use their services to go to a public transportation stop or other designated location of interest.

Ridesharing services can allocate more cars and/or drivers to these locations to convert public transportation users to their rideshare business. If drivers are directed to these potentially high demand areas, their wait time for new customers would be decreased as well.

Similar to the item above, ridesharing services can install bike, scooter, etc. rental stations, such that public transportation customers would ride the services' bikes, scooters, etc. to their final destination, instead of using public transportation.

Ridesharing services choose routes that traverse identified high pedestrian-flow locations so as to increase the chances of finding more travelers to pick-up en-route. This is especially advantageous for ridesharing with multiple travelers in one rideshare vehicle.

Mobility providers can use this data to optimize a marketplace of ridesharing costs such that it exploits the pedestrian flow and OD data 111 to obtain increased service usage and/or revenue.

Figure 2:
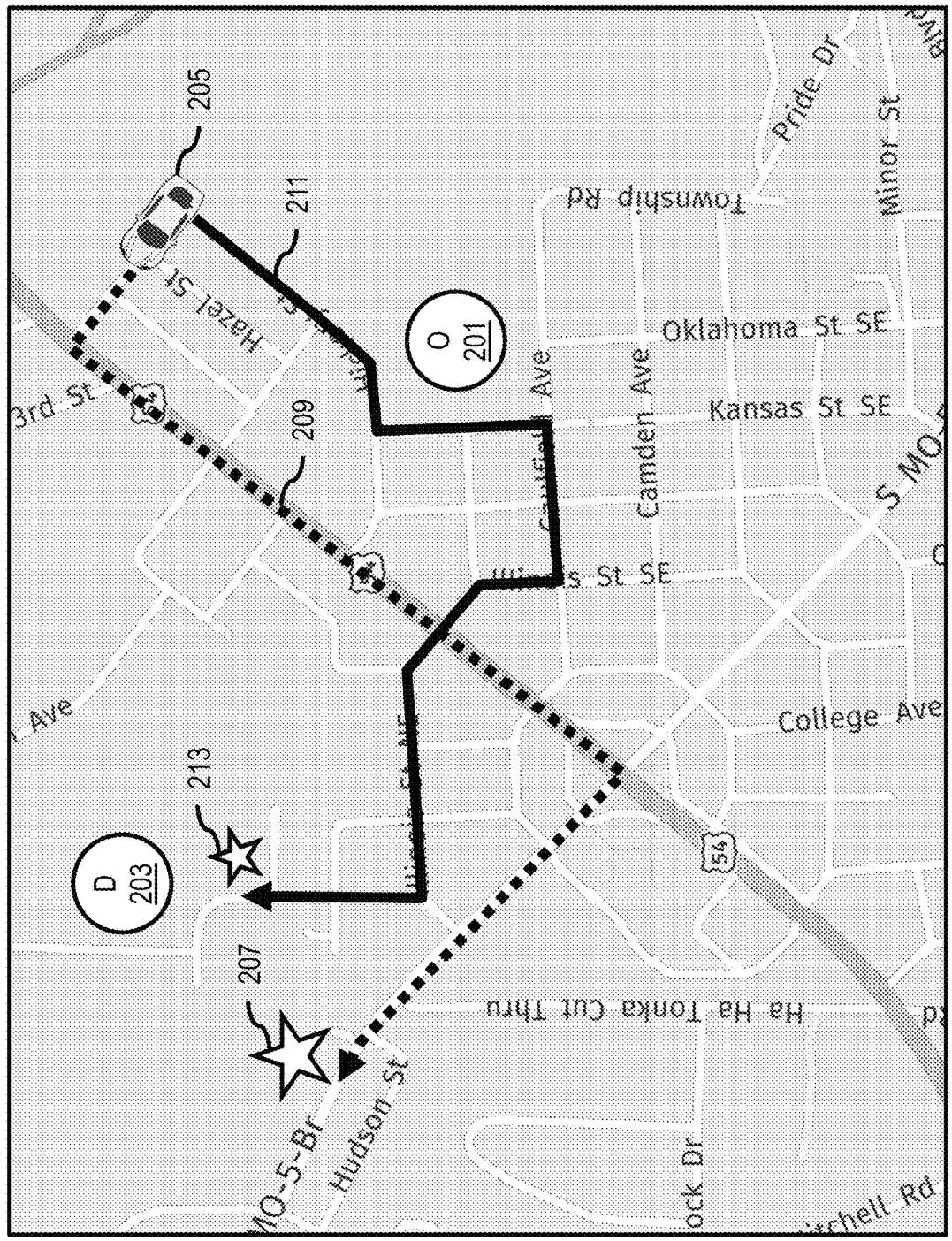
FIG. 2 is a diagram illustrating an example of using pedestrian probe data to optimize routing in a ridesharing service, according to example embodiment(s)

FIG. 2 is a diagram illustrating an example of using pedestrian probe data to optimize routing in a ridesharing service, according to example embodiment(s). More specifically, FIG. 2 shows how mobility providers (e.g., ridesharing service providers, ride-hailing service providers, etc.) can optimize routes to overlap with a higher number of pedestrian routes, thereby potentially picking up more passengers and increasing revenue. The pedestrian OD data 111 obtained from pedestrian flow analytics (e.g., based on pedestrian probe data 109 collected from the area) is used an input. As shown, resulting clustered pedestrian OD locations are represented by the circle marked O 201 which is a detected pedestrian origin and circle marked D 203 which is a detected pedestrian destination of the pedestrian paths detected in the area. In other words, the pedestrian probe data 109 indicate that there is high number (e.g., greater than a threshold value) of pedestrian paths that flow from O 201 to D 203 and therefore a high number of pedestrians can be expected between O 201 and D 203.

In this example, a ridesharing vehicle 205 carrying a passenger to a destination 207 is traveling through the area and would have taken a faster highway route 209 (e.g., indicated by a dashed line). However, the system 100 has calculated an alternate route 211 (e.g., indicated by a solid line) that takes the vehicle 205 through the area where pedestrians are more likely be traveling between O 201 and D 203. The vehicle 205 takes the alternate route 211 as this increases the vehicle 205's chances of finding additional passengers en-route to the first destination 207. When the vehicle 205 finds additional passengers along this alternate route 211, it is easy to drop the passengers at their respective destinations (e.g., destination 213) which is "good-enough" (e.g., within a threshold proximity) in the direction of the first destination 207 of the initial passenger. In one embodiment, the system 100 can compute a similarity metric between the routes between O 201 and D 203 of the pedestrian OD-matrix data 111 and the possible routes the vehicle 205 (e.g., a taxi or ridesharing vehicle) can take, and will optimize by preferring routes that have more overlap with the OD routes.

The various embodiments described herein provide a way for ridesharing services companies (e.g., companies operating a services operating services platform 121, any of the services 123a-123j—also collectively referred to as services 123—of the services platform 121, and/or content providers 125a-125k—also collectively referred to as content providers 125—related to mobility services) to strategically focus on certain geographic areas, locations, routes, etc. based on pedestrian probe data 109 (e.g., data from pedestrians using mass transportation or otherwise associated with any other designated location or point of interest). This pedestrian probe data 109 and related OD data 111 are very valuable as they are mostly coming from potential customers and not existing customers, who can potentially be lured into using a ridesharing service instead of walking.

The various embodiments described herein describe various technical solutions for ridesharing services, and provide for advantages including but not limited to:

(a) People walking to a stop to board a bus, train, etc. can use ridesharing services (e.g., cars, bikes, scooter, etc. share services) to get to the stop.
(b) Ridesharing services can convert users of public transportation or other pedestrians to their own customer.
(c) Ridesharing services can reduce the wait or idle times of their cars/drivers by focusing on geographic zones with high potentials of new customers as determined from pedestrian probe data 109.

Figure 3:
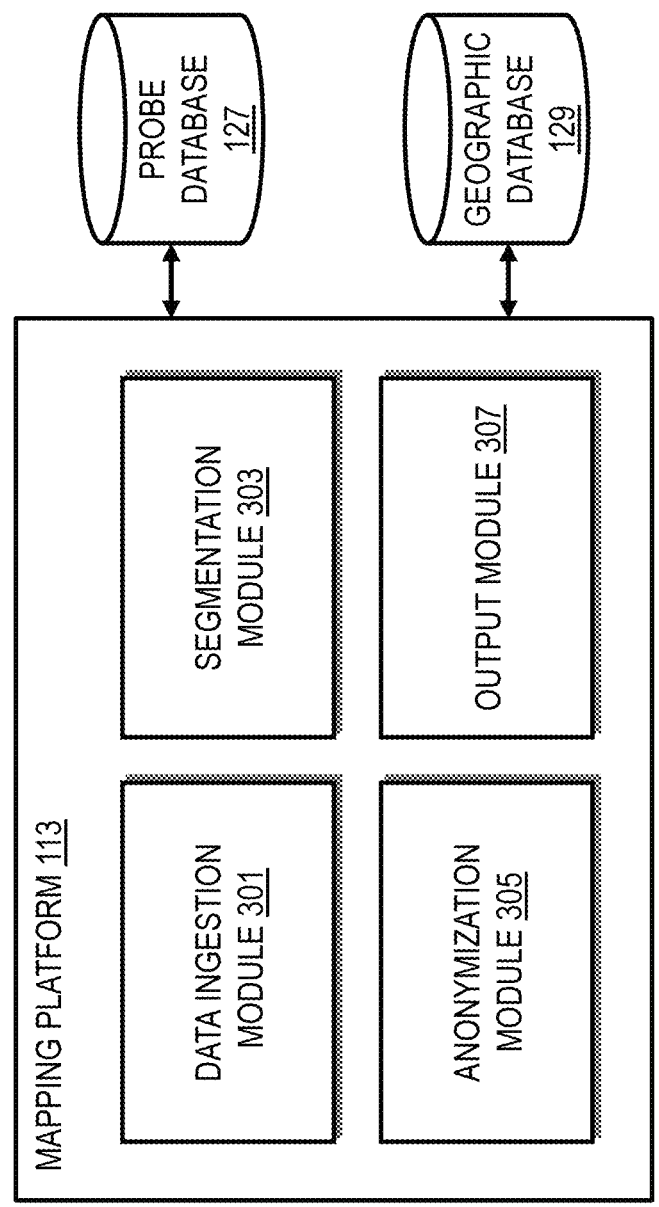
FIG. 3 is a diagram of components of a mapping platform capable of using pedestrian probe data for ridesharing services, according to example embodiment(s)

In one embodiment, as shown in FIG. 3, a mapping platform 113 of the system 100 includes one or more components for using pedestrian probe data 109 for ridesharing services according to the various embodiments described herein. It is contemplated that the functions of the components of the mapping platform 113 may be combined or performed by other components of equivalent functionality. As shown, in one embodiment, the mapping platform 113 includes a data ingestion module 301, a path module 303, an origin/destination (OD) module 305, and an output module 307. In one embodiment, the mapping platform 113 also has access to a probe database 127 for storing pedestrian probe data 109 collected from pedestrian probe devices 101, and a geographic database 129 that includes digital map data for processing the pedestrian probe data 109 (e.g., map matching, road segment identification, routing, etc.) and/or providing related location-based services. The above presented modules and components of the mapping platform 113 can be implemented in hardware, firmware, software, or a combination thereof. Though depicted as a separate entity in FIG. 1, it is contemplated that the mapping platform 113 may be implemented as a module of any of the components of the system 100 (e.g., a component of the services platform 121, services 123, content providers 125, probe devices 101 (e.g., UEs 105), and/or the like. In another embodiment, one or more of the modules 301-307 may be implemented as a cloud-based service, local service, native application, or combination thereof. The functions of the mapping platform 113 and modules 301-307 are discussed with respect to FIGS. 4-10 below.

Figure 4:
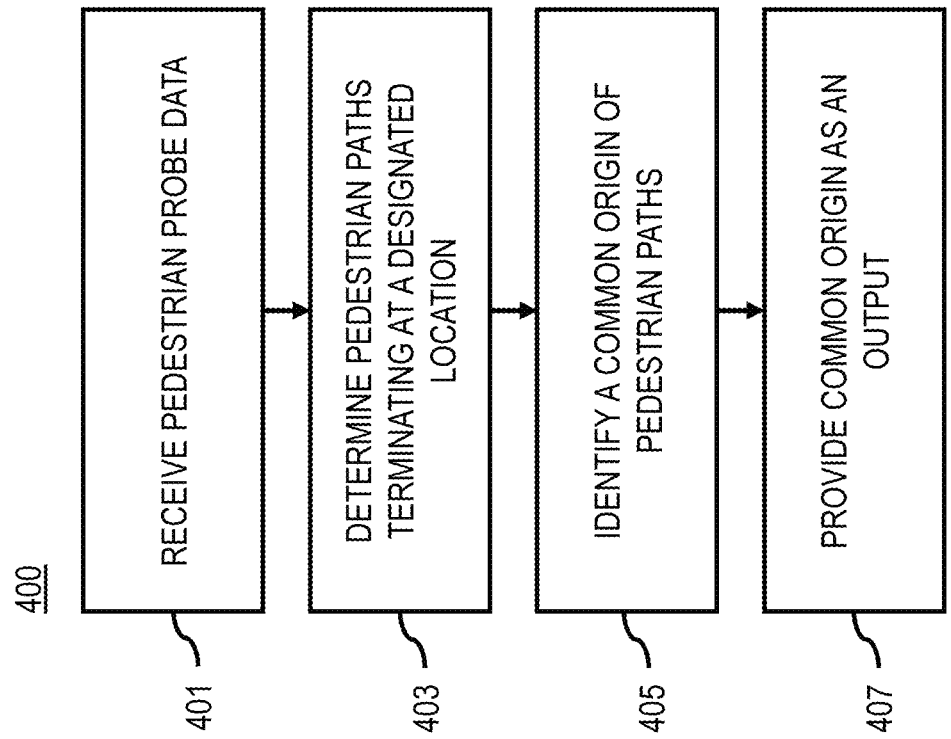
FIG. 4 is a flowchart of a process for using pedestrian probe data for ridesharing services, according to example embodiment(s)
Figure 13:
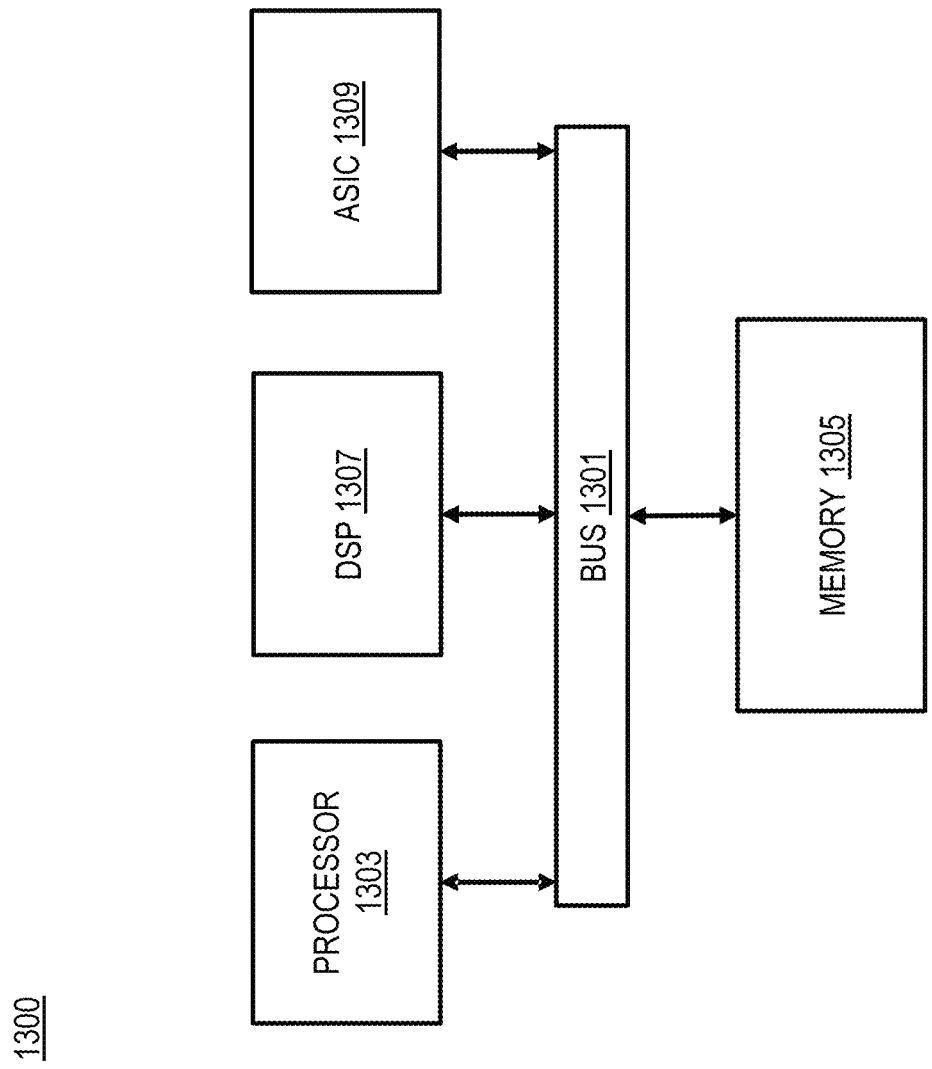
FIG. 13 is a diagram of a chip set that can be used to implement an embodiment.

FIG. 4 is a flowchart of a process 400 for using pedestrian probe data for ridesharing services, according to example embodiment(s). In various embodiments, the mapping platform 113 and/or any of the modules 301-307 may perform one or more portions of the process 400 and may be implemented in, for instance, a chip set including a processor and a memory as shown in FIG. 13. As such, the mapping platform 113 and/or any of the modules 301-307 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In one embodiment, the process 400 identifies common routes for pedestrians walking to a designated location of interest (e.g., in a publication transportation, the designated location can be a train station, metro station, bus stop, and/or the like) and using this information, to compute optimum locations for ridesharing or other mobility services (e.g., bike, scooter, car, etc. share companies) to allocate their resources (e.g., vehicles/drivers) and/or build their service stations (e.g., bike or scooter rental stations). This process 400 analyzes, for instance, pedestrian probe data 109 and/or pedestrian origin-destination (OD) data 111, such that ridesharing services can take advantage of new potential customers. Although the various embodiments described herein refer to ridesharing services (e.g., bike, scooter, car, etc. sharing services), it is contemplated that the embodiments are also applicable to ride-hailing services (e.g., taxis) or another other mobility service that competes against or includes pedestrian travel.

In one embodiment, the process 400 identifies geographic areas, locations, routes, etc. of high demand such that ridesharing companies or services can focus their resources to these locations. By way of example, as described above, ridesharing services use these locations for the purposes such as but not limited to:

They can install ridesharing stations, such that commuters can take use their services to go to a public transportation stop.

They can allocate more cars and/or drivers to these locations to convert public transportation users to their rideshare business. If drivers are directed to these potentially high demand areas, their wait time for new customers would be decreased as well.

They can install ridesharing rental stations, such that public transportation customers would ride their bikes, scooters, cars, etc. to their final destination, instead of using public transportation.

The high-level tasks to accomplish this goal are:
1. For a given public transportation stop or other designated location, define a search zone;
2. Analyze pedestrian ODs in this search zone;
3. Mark paths terminating at these public transportation stops or other designated locations, denoted as pedestrian paths or public transportation paths;
4. Identify common origins of these paths, from which commuters start their journeys to or from these public transportation stops or other designated location; and
5. Calculate optimum ridesharing locations and/or other ridesharing service recommendations 119 (e.g., resource allocations, service station locations, etc.).

This type of planning can be superior to using plain population densities, as the goal is to go after high density areas of pedestrian traffic (e.g., pedestrians who are also public transportation users). Put differently, a high population density area might have a high volume of commuters by car and with very low usage of public transportation or pedestrian modes of travel. Therefore, population density alone may not provide enough information for ridesharing services to efficiently allocate their resources across different geographic areas.

In one embodiment, the process 400 assumes that the mapping platform 113 has access to digital map data of designated locations of interest. For example, in a public transportation use case, the map data can include point-of-interest (POI) data, which either indicates train stations, metro stations, bus stops, and/or the like or at least can be used to infer this information. Although the various embodiments described herein are discussed with respect to a public transportation use case, it is contemplated that the embodiments are applicable for determining pedestrian flow around any geographic location, area, route, etc. designated as a location of interest for purposes providing ridesharing service recommendations 119. In one embodiment, the mapping platform 113 can query the designated location (e.g., transportation stop) as a point of interest from the digital map data of the geographic database 129.

Accordingly, in step 401, the data ingestion module 301 of the mapping platform 113 receives pedestrian probe data from a search zone associated with a designated location.

The designated location can be specified by the ridesharing service or inferred based on available pedestrian probe data 109 (e.g., locations where pedestrian activity or paths exceed a threshold level). For example, if the ridesharing service is analyzing locations that supplement or address the last mile problem (e.g., getting a customer from a public transportation station or stop to the customer's final destination), the designated locations can include, but is not limited to, train stations, metro stations, bus stops, etc. The search zone can then be specified based on the designated location by sitting a proximity threshold, radius, boundary, etc. around the location. In one embodiment, the pedestrian probe data is collected from one or more location sensors of at least one device (e.g., a pedestrian probe device 101) associated with at least one pedestrian 103 (e.g., a location-capable UE 105 carried by the pedestrian 103).

For example, the data ingestion module 301 can pedestrian probe data 109 directly from the probe devices 101 (e.g., collected from one or more sensors of the probe devices 101 such as GNSS receivers or equivalent location sensors) or via third party aggregator (e.g., a device manufacturer cloud or content provider 125) over a communication network 131 for storage in the probe database 127 and processing according to the embodiments described herein. By way of example, the device manufacturer cloud can be operated by a device manufacturer to collect pedestrian probe data 109 from its corresponding models of UE devices 105 for transmission to the mapping platform 113. By way of example, transmissions between the probe devices 101, mapping platform 113, and/or other components of the system 100 can occur over the communication network 131 or equivalent (e.g., a separate logical channel that ultimately flows data over the Internet or other data network). In one embodiment, the pedestrian probe data 109 can include mobility traces or trajectories associated with individual probe devices 101 which have been anonymized to prevent attribution to a natural person (e.g., by using pseudonyms or probe identifiers that are not associated with a natural person or include attributes or meta-data from which the association to a natural person can be derived).

In step 403, the path module 303 processes the pedestrian probe data 109 to determine one or more pedestrian paths terminating at the designated location (e.g., a public transportation station, stop, etc.). For example, the path module 303 can sort the probes in the pedestrian probe data 109 according to their respective probe identifiers to group probes belonging to the same path. The probes can then be sequenced according to their respective timestamps to determine individual probe paths or trajectories traversing the geographic areas corresponding to the search zone. In one embodiment, the path module 303 can further filter the detected pedestrian probe paths based on the whether the paths terminate, originate, and/or pass through the designated location of interest. For example, in a public transportation use case, the path module 303 can select the pedestrian probe paths that terminate, originate, and/or pass through public transportation stations or stops.

In step 405, the OD module 305 identifies at least one common origin and/or destination of the one or more pedestrian paths. In one embodiment, the OD module 305 can construct an OD matrix (e.g., OD data 111) based on the pedestrian probe paths. As shown in the example of Table 1 below, an OD matrix identifies all origins of the identified probe paths along a first axis of the matrix and all destinations of the identified probe paths along a second axis of the matrix. Each element of the axis then corresponds to a different O/D combination, and the value in each element represents a count of the identified pedestrian probe paths that have the corresponding O/D combination. In other words, the OD module 305 can generate an origin-destination matrix from the pedestrian probe data 109, and then the one or more pedestrian paths are determined based on the origin-destination matrix.

TABLE 1

|  | ORIGIN 1 | ORIGIN 2 | ORIGIN 3 | ORIGIN 4 |
| --- | --- | --- | --- | --- |
| DESTINATION 1 | 10 | 25 | 5 | 7 |
| DESTINATION 2 | 2 | 5 | 20 | 11 |
| DESTINATION 3 | 9 | 1 | 4 | 17 |

In one embodiment, to determine common origins and/or destinations, the OD module 305 can analyze the OD data 111 to determine which origins and/or destinations have corresponding pedestrian path counts about a threshold value. For example, if the count threshold is 20 or above, then origin 2 and origin 3, and/or destination 1 and destination 2 can be determined to be common origins or common destinations. It is noted that the example of using a threshold value for determining a common origin and/or destination is provided by way of illustration and not as a limitation. It is contemplated that the OD module 305 can use any means, criteria, rule, process, algorithm, etc. for determining which of the origins and/or destinations of the pedestrian OD matrix can be classified as common according to the embodiments described herein. For example, statistical methods including but not limited to outlier analysis, standard deviations, maximum, minimum, etc. can be used in the embodiments described herein.

In step 407, the output module 407 can provide the least one common origin, the at least one common origin, or a combination thereof as an output. In one embodiment, the output can be provided to a ridesharing service for determining one or more ridesharing locations, one or more ridesharing resource allocations, or a combination thereof (e.g., for determining ridesharing service recommendations 119).

In one embodiment, the determination of the ridesharing locations and/or ridesharing resource allocations is described below with respect to, but not limited to, a public transportation use case. More specifically, this section provides an algorithm to calculate optimum locations for ridesharing resource allocation. By way of example, these optimum locations are those, from which a high number of pedestrians start their journey when they use public transportation.

In one embodiment, at a high level, the algorithm can be summarized as follows:

1. Calculate a heat map of origin points around the selected public transportation stop or other designated location. These origins are part of OD patterns that terminate at the stop or other designated location.
2. Construct distance and/or travel-time based zones around the public transportation stop or other designated location, which are differentiated from each other based on distance from the stop or location (e.g., as short-, medium-, and long-distance zones).
3. Overlay the origin heat map with distance and/or travel-time based zones.
4. Select zones which have a target or selected origin density and distance.
5. Use a set of heuristics to pick optimum locations from the zones determined in step 4. These locations are recommended to the rideshare companies such that they can focus their resources into these locations; e.g., deploy their bike, scooter, car, etc. rental stations, increase their car and/or driver resources in that area, etc.

The following sections describe these steps of the algorithm in more detail with respect to FIGS. 5-10.

Figure 5:
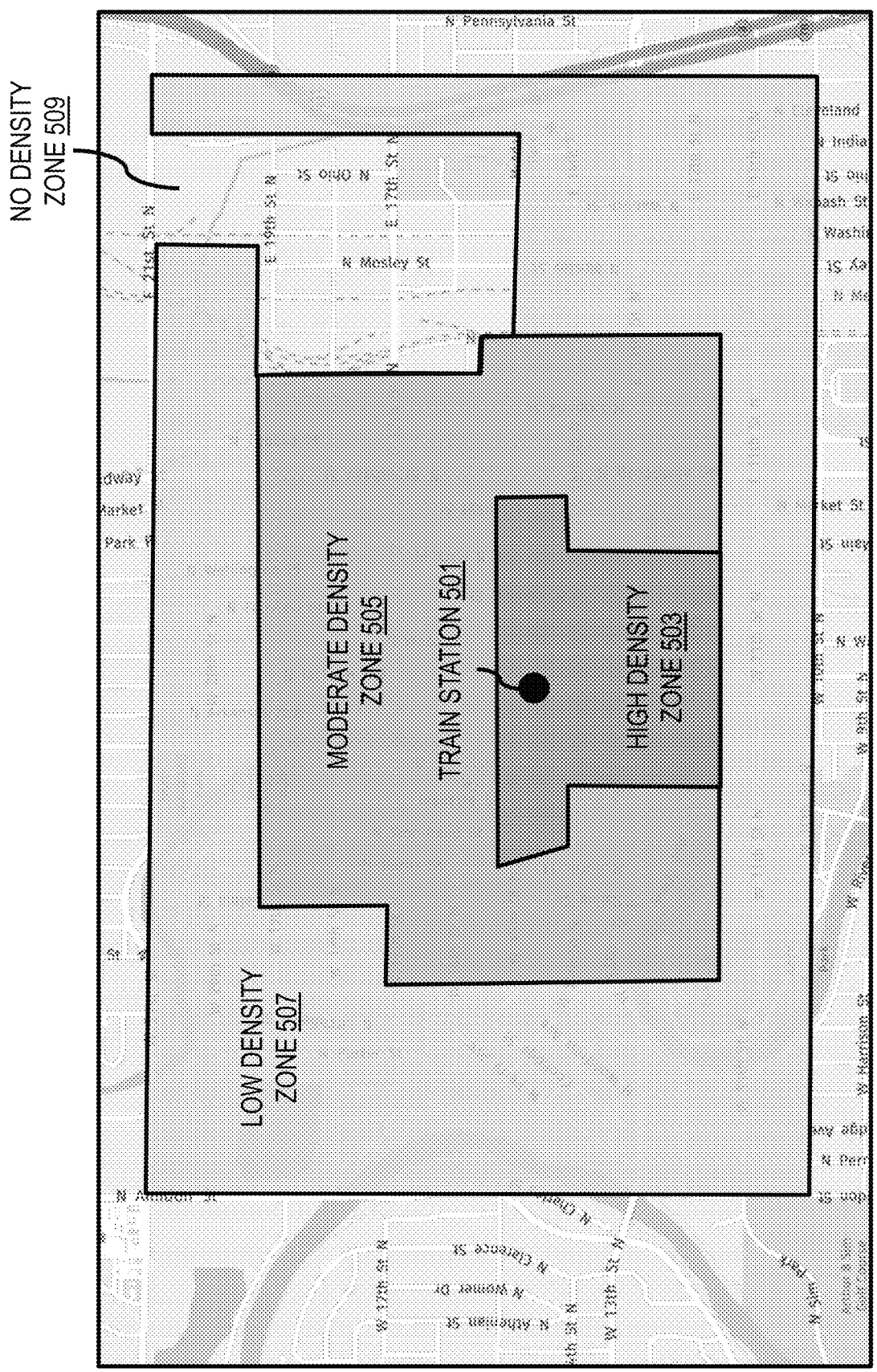
FIG. 5 is diagram illustrating an origin heat map around a point of interest, according to example embodiment(s)

In one embodiment, the mapping platform 113 constructs a heat map using the identified common origins for paths terminating at public transportation stops or other designated locations. Different density areas based on the number of pedestrians staring their trips to the public transportation stations or stops can be represented in the heat map. For example, high density areas indicate a high number of pedestrians starting their trips in destination to public transportation stops or other designated locations. An example heat map is illustrated in FIG. 5 relative to a train station location 501. Not surprisingly, high density zones (e.g., high density zone 503) from which the majority of public transportation pedestrian users start their trip, are closer to the train station 501. The density decreases as the start distance to the train station 501 increases. For example, the density decreases in the moderate density zone 505 which is farther from the train station 501, and decreases even more in the low density zone 507 even further from the train station 501. Finally, areas with no density or starting points (e.g., no density zone 509) are even farther away. This density distribution reflects the observation that it is more convenient for pedestrians to use public transportation or reach a designated location, if they can access it with less effort. In other words, the mapping platform 113 can calculate a heat map of a plurality of candidate origin points of the one or more pedestrian paths (e.g., determined origins of the detected pedestrian paths) that terminate at the designated location (e.g., transportation stop). Then at least one common origin is determined based on the heat map (e.g., for recommending ridesharing locations and/or ridesharing resource allocations).

For the rest of this section, the example of the train station 501 of FIG. 5 will be used in place of public transportation stop or other designated location.

In one embodiment, choosing the optimum ridesharing location and/or ridesharing resource allocation can be used for purposes such as but not limited to:

1. To reach a high number of pedestrians who could potentially use rideshare services, and
2. To provide pedestrians with an attractive alternative than walking to the train station.

In one embodiment, the optimum ridesharing locations and/or ridesharing resource allocations can be used to recommend a change in a ridesharing service at the locations. For example, changes in the number of available bikes, scooters, cars, drivers, etc. at the location can be initiated to more efficiently use available resources or increase the potential to attract new customers who have been previously walking. More generally, the changes can include but are not limited to installing a ridesharing station at the one or more ridesharing locations, allocating additional ridesharing resources within a threshold proximity of the one or more ridesharing locations, installing a ridesharing station at the designated location to serve the one or more ridesharing locations, or a combination thereof.

In one embodiment, given the heat map described above (e.g., the heat map of FIG. 5), the following features can be used in determining optimum locations:

1. Density of public transportation user origins, and
2. Distance to the public transportation station (e.g., distance to the train station 501 in FIG. 5).

In one embodiment, density of origins is a factor in determining optimum locations and/or resource allocations, because the goal is to reach as many pedestrians as possible. If the algorithm returns a location, which corresponds to a low density zone 507 in FIG. 5, then the ridesharing service would be reaching out to a small portion of their new potential customers. In order to minimize idle bike, scooter, car, driver, etc. time, it generally can be for the ridesharing service's best interest to focus on high density zones 503.

However, in one embodiment, the OD module 305 cannot simply return any location in a high-density zone either. For instance, a location 50 meters away from the train station 501 could be in a high-density zone 503. This location would be very convenient for a pedestrian to take the train and difficult for a rideshare company to offer their services: it would be pointless to install a bike, scooter, car, etc. share station targeting this pedestrian, as it probably is shorter to walk to the train station 501 than to get set up with the ridesharing service and then ride to the train station 501. Similarly, because it is so convenient to get to the train station 501 from this 50 m location, ridesharing services have very limited options in terms of incentives to offer to these pedestrians with the goal of luring them from public transportation to their own services.

Figure 6:
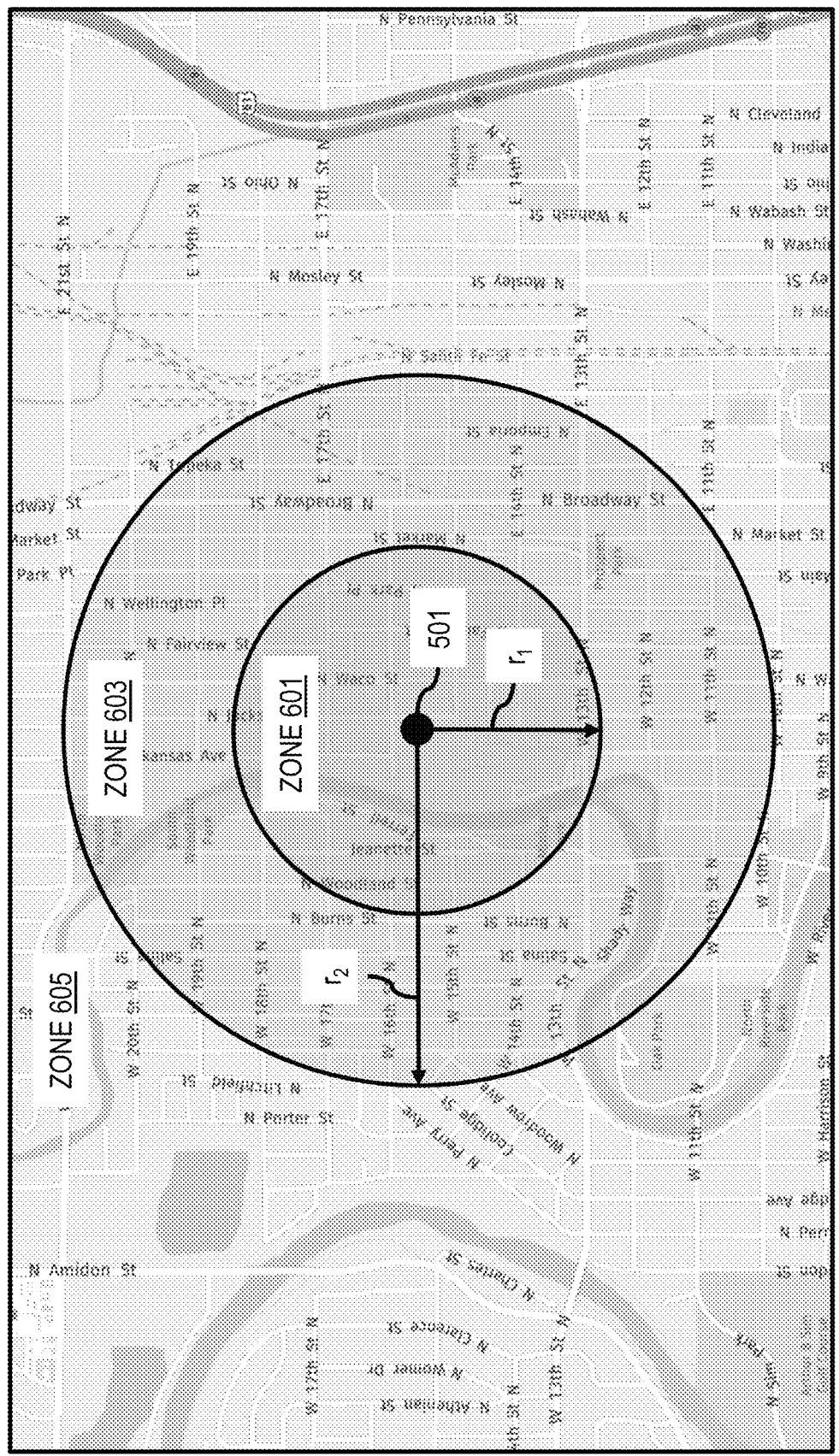
FIG. 6 is diagram illustrating distance-based zones around a point of interest, according to example embodiment(s)

So far, the OD module 305 has constructed zones of varying density for a particular train station 501. Next, in one embodiment, the OD module 305 can divide the map into three zones based on distance or travel time. FIG. 6 illustrates an example of Euclidian distance-based zones.

For example, the zones 601-605 are constructed as follows. For zone 601, all locations P in the zone 601 are at most $r_1$ meter from the train station 501; i.e. within the circle of radius r1 meters from the train station 501. This can be expressed as:

$$\text{Zone } 601 = \forall P, \text{ where } \text{dist}(P, \text{TrainStation}) \leq r_1$$

where P is a location in zone 601, TrainStation is the location of the train station 501, dist is a function that calculates the distance between P and TrainStation, and $r_1$ is a first radius from TrainStation. As shown, dist calculates distance based on a Euclidean distance. However, it is contemplated that any distance metric can be used. For example, another method of constructing these zones could be using Manhattan distance, which is calculated over blocks separated by intersections. Whichever distance metric is used, the underlying idea is to divide the map into zones based on some sort of a distance metric from the train station 501 or other designated location. In one embodiment, locations P within zone 601 are considered too close to the train station 501. Therefore, the OD module 305 does not recommend them. Alternatively, if the OD module 305 chooses to keep them in the recommendation list, the OD module 305 deprioritizes them.

For zone 605, all locations P in zone 605 are farther than $r_2$ meters away from the train station 501. Locations P in zone 605 are considered too far from the train station 501 and are not part of the search are for OD paths. In other words, zone 605 is outside of the search zone for pedestrian probe data 109 associated with the train station 501 or other designated location.

For zone 603, all locations P in zone 603 are farther than $r_1$ meters and at most $r_2$ meters from the train station 501; i.e. within the ring between radii $r_1$ and $r_2$ away from the train station (the striped area). This can be expressed as:

$$\text{Zone } 603 = \forall P, \text{ where } r_1 \leq \text{dist}(P, \text{TrainStation}) \leq r_2$$

where P is a location in zone 603, TrainStation is the location of the train station 501, dist is a function that calculates the distance between P and TrainStation, $r_1$ is a first radius from TrainStation, and $r_2$ is a second radius farther from TrainStation than $r_1$. In other words, zone 603 is between zone 601 and zone 605. In one embodiment, this OD module 305 considers zone 603 the optimal zone to recommend for ridesharing services. Any location in the ring represented by zone 603 is far enough from the train station 501 that it makes sense to offer rideshare services to and still included in the search zone.

Figure 7:
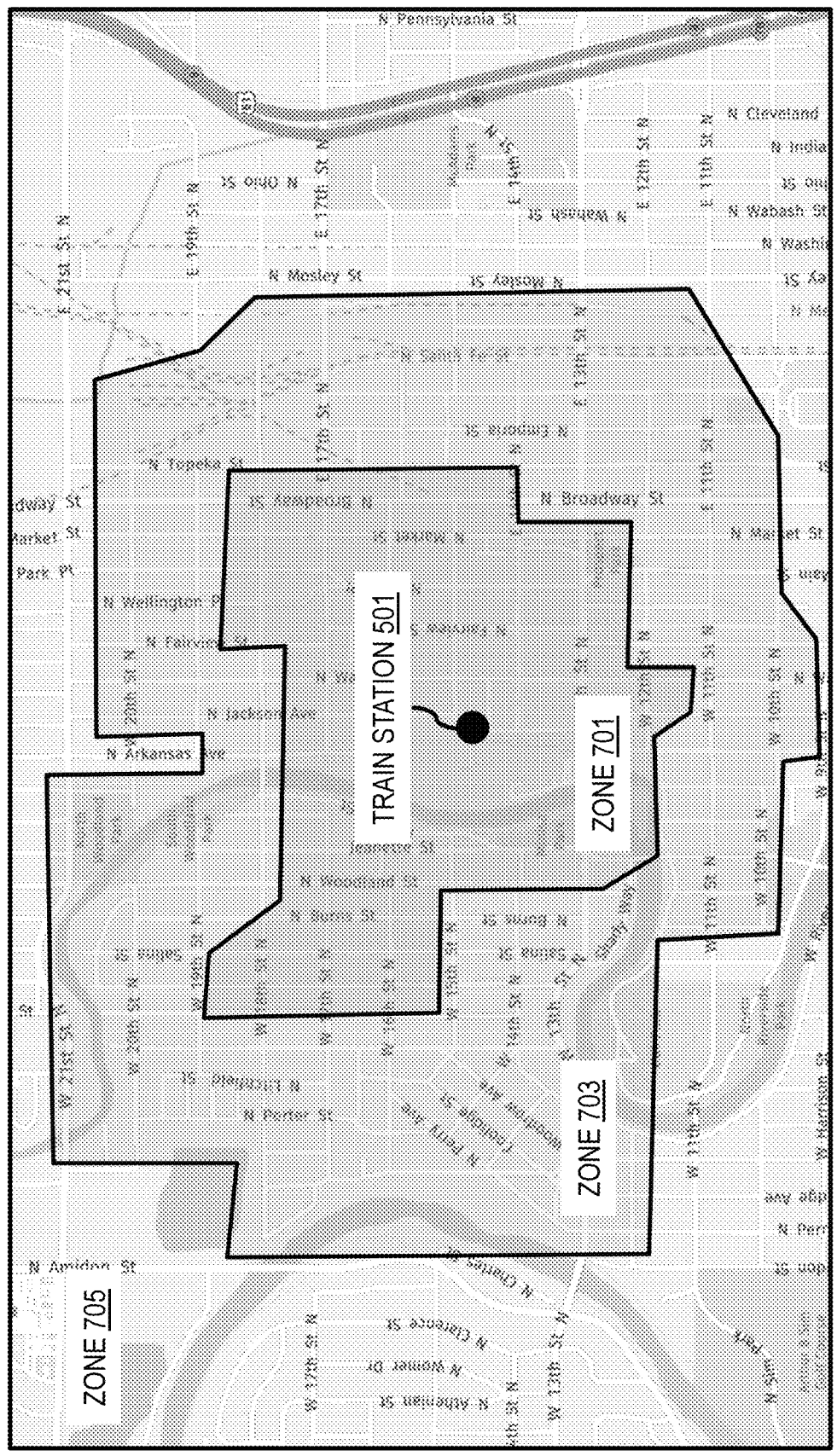
FIG. 7 is diagram illustrating travel time-based zones around a point of interest based on pedestrian probe data, according to example embodiment(s)

In one embodiment, another way of dividing the map into different zones is to use travel time as a distance measure. In other words, the OD module 305 can construct a plurality of zones around the designated location (e.g., transportation stop). The plurality of zones, for instance, is based on a travel distance, a travel time, or a combination thereof from the zone to the designated location. At least one common origin location can be determined from the zones to recommend optimum ridesharing locations and/or ridesharing resource allocations. In one embodiment, pedestrian walking speed is considered when calculating travel time. This is illustrated in FIG. 7. Again, the map is divided into three zones 701-705 around the train station using travel time. For zone 701, all locations P in the zone 701 are within $t_1$ minutes of travel distance from the train station 501. This can be expressed as:

$$\text{Zone } 701 = \forall P, \text{ where travel\_time}(P, \text{TrainStation}) \leq t_1$$

where P is a location in zone 701, TrainStation is the location of the train station 501, travel_time is a function that calculates the travel time between P and TrainStation given a walking speed, and $t_1$ is a first travel time threshold. Similar to zone 601 described above, the travel time within zone 701 is considered too short for a pedestrian to select a ridesharing option over simply walking. Accordingly, in one embodiment, the OD module 305 can either exclude zone 701 in its recommendations or deprioritize the zone 701.

For zone 705, all locations P in zone 705 are farther than $t_2$ minutes away from the train station 501. Zone 705 is similar to zone 605 above and is outside of the search zone around the train station 501. In other words, the mapping platform 113 does not process pedestrian probe data 109 in this zone.

In one embodiment, zone 703 is the optimal zone, which the OD module 305 considers when recommending optimum ridesharing locations and/or ridesharing resource allocations. Any location P within zone 703 is farther than $t_1$ minutes but closer than $t_2$ minutes away from the train station 501. This can be expressed as:

$$\text{Zone } 703 = \forall P, \text{ where } t_1 \leq \text{travel\_time}(P, \text{TrainStation}) \leq t_2$$

where P is a location in zone 703, TrainStation is the location of the train station 501, travel_time is a function that calculates the travel time between P and TrainStation given a walking speed, $t_1$ is a first travel time threshold, and $t_2$ is a second travel time threshold greater than $t_1$.

In one embodiment, the OD module 305 can overlay the origin heat map and distance/travel-time zones to recommend optimal ridesharing locations and/or ridesharing resource allocations. For example, at this point, the OD module 305 has constructed density-based heat map zones as well as distance and/or travel-time based zones around the train station 501. As the next step, the OD module 305 overlays these zones to rank them in importance. In one embodiment, this ranking can be used in recommending optimal locations for ridesharing stations or waiting zones for cars.

Figure 8:
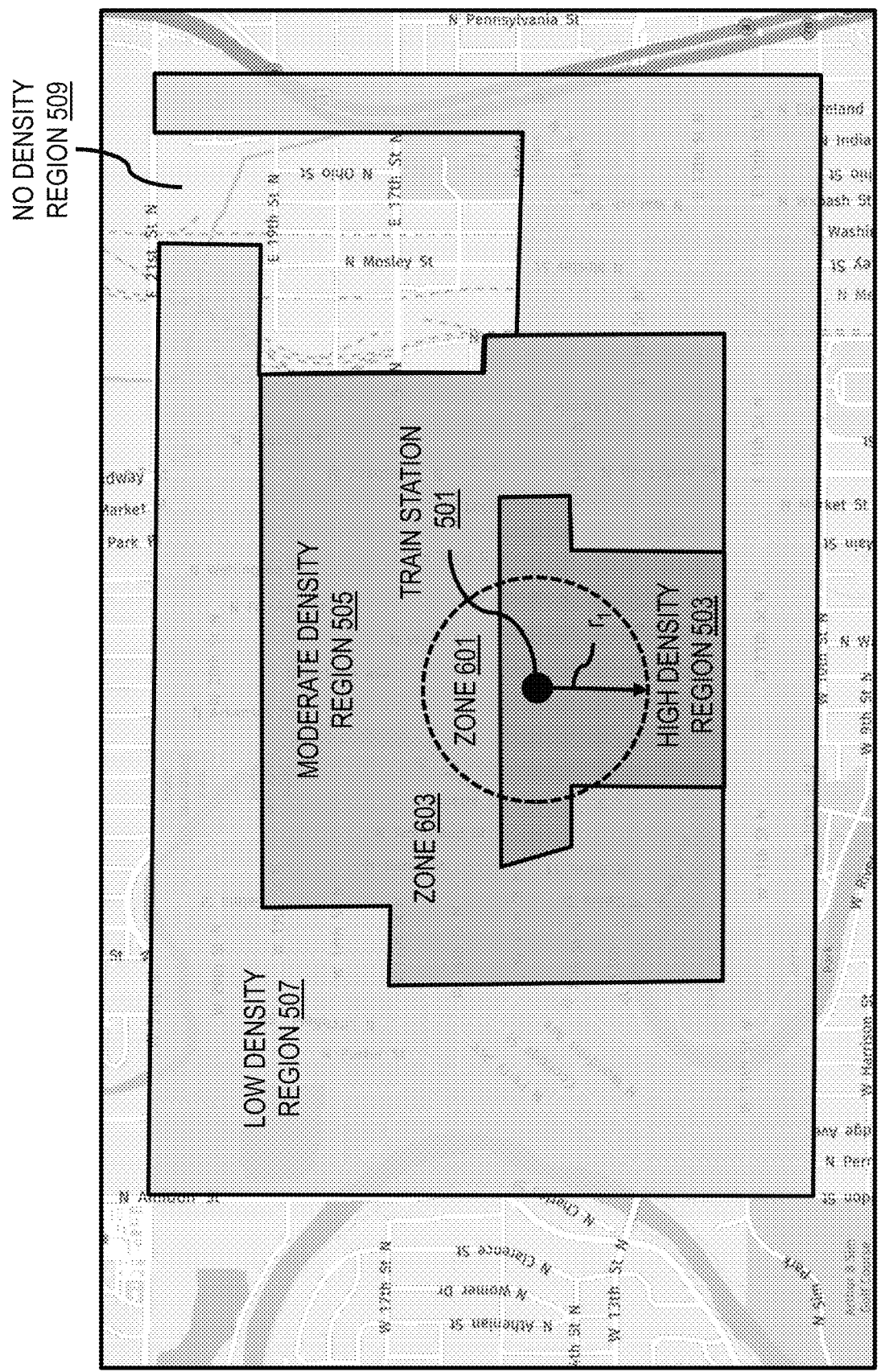
FIG. 8 is diagram illustrating a density heat map overlaid with distance-based zones, according to example embodiment(s)

FIG. 8 is diagram illustrating a density heat map overlaid with distance-based zones, according to example embodiment(s). FIG. 7 shows the circle boundary for zone 601, which is referred to as a "short distance." The OD module 305 can promote locations in medium distance zones (e.g., zone 603, outside of the circle corresponding to zone 601. The OD module 305 then prioritizes locations by density. Therefore, the highest weighted locations (e.g., weighted for recommending ridesharing locations and/or ridesharing resource allocations) are in high density-medium distance zones, followed by medium density-medium distance zones.

Figure 9:
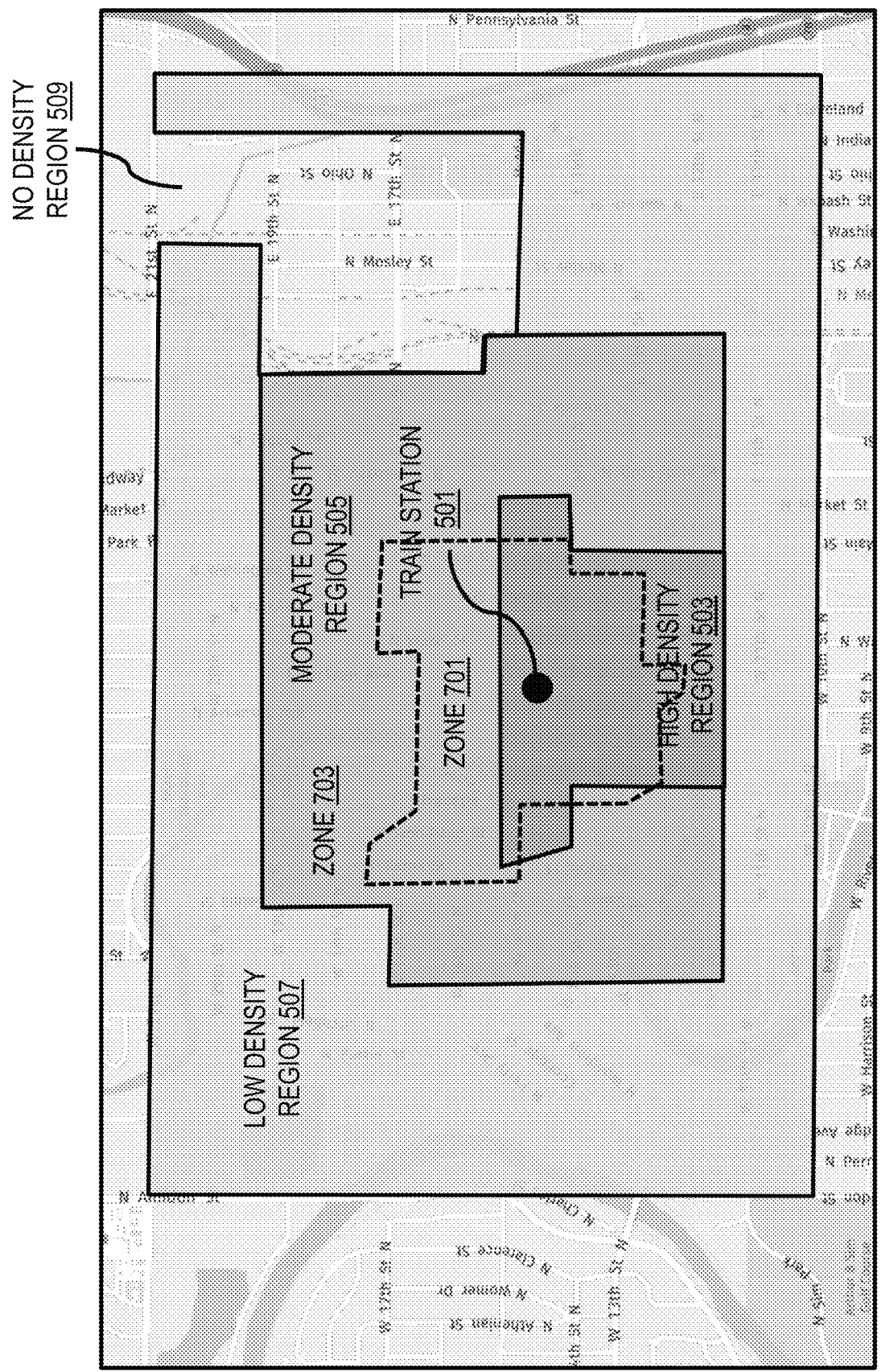
FIG. 9 is diagram illustrating a density heat map overlaid with distance-based zones, according to example embodiment(s)

In one embodiment, a similar overlay involving travel-time based zones 701 and 703 of FIG. 7 is shown in FIG. 9. Similar to distance zone overlay of FIG. 8, inside of the central polygon corresponding to zone 701 (e.g., "short travel time" zone) is marked as short-distance zone and is deprioritized for recommendation by the OD module 305. Again, the highest scored or weighted locations for recommendation are high density-medium distance and medium density-medium distance locations. Note that distance in this configuration is measured as travel time (via walking) to the train station 501.

In one embodiment, the OD module 305 can apply heuristics to pick the optimum ridesharing locations and/or ridesharing resource allocations from the weighted locations. For example, at this point, the algorithm has narrowed down its search for optimum locations to certain zones. In one embodiment, at least one common origin can be determined based on an origin density criterion in a zone, a distance of the zone from the designated location (e.g., transportation stop), or a combination thereof to determine to optimum ridesharing locations and/or resource allocations. When finalizing or selecting the optimum ridesharing locations and/or resource allocations, the OD module 305 can use some or all of the following heuristics:

1. For the same density zone, pick locations that are further away from the train station 501. The longer the distance to walk, the more convenient it is to use a bike, scooter, or other ridesharing option to go to the train station 501 or other designated location or the more convincing it is to reject public transportation in favor of a ridesharing service (e.g., including bike, scooter and car share).
2. Depending on the size of the highest scoring zone, drivers can be instructed to patrol the entire zone or partial zones.
3. If instead of idly driving cars, it can preferential for them to park/stop and wait for their next customer. Accordingly, in one embodiment, locations near parking lots, roads with street parking, or with convenient spots to park are prioritized.
4. For bike or scooter ridesharing stations, locations on or close (e.g., with a threshold proximity) to streets with bike lanes or locations close to bike paths are prioritized.
5. If multiple locations are selected, their distance from each is maximized by respecting the heuristics above such that there is no overlap in service area.

In one embodiment, the OD module 305 can determine optimum ridesharing locations and/or ridesharing resource allocations for multiple public transportation stops or multiple designated locations. For example, often times multiple public transportation stops are in close proximity to each other. In those cases, instead of calculating an optimum location for each stop in isolation, the OD module 305 can determine optimum locations or resource allocations over all stops in the area.

Figure 10:
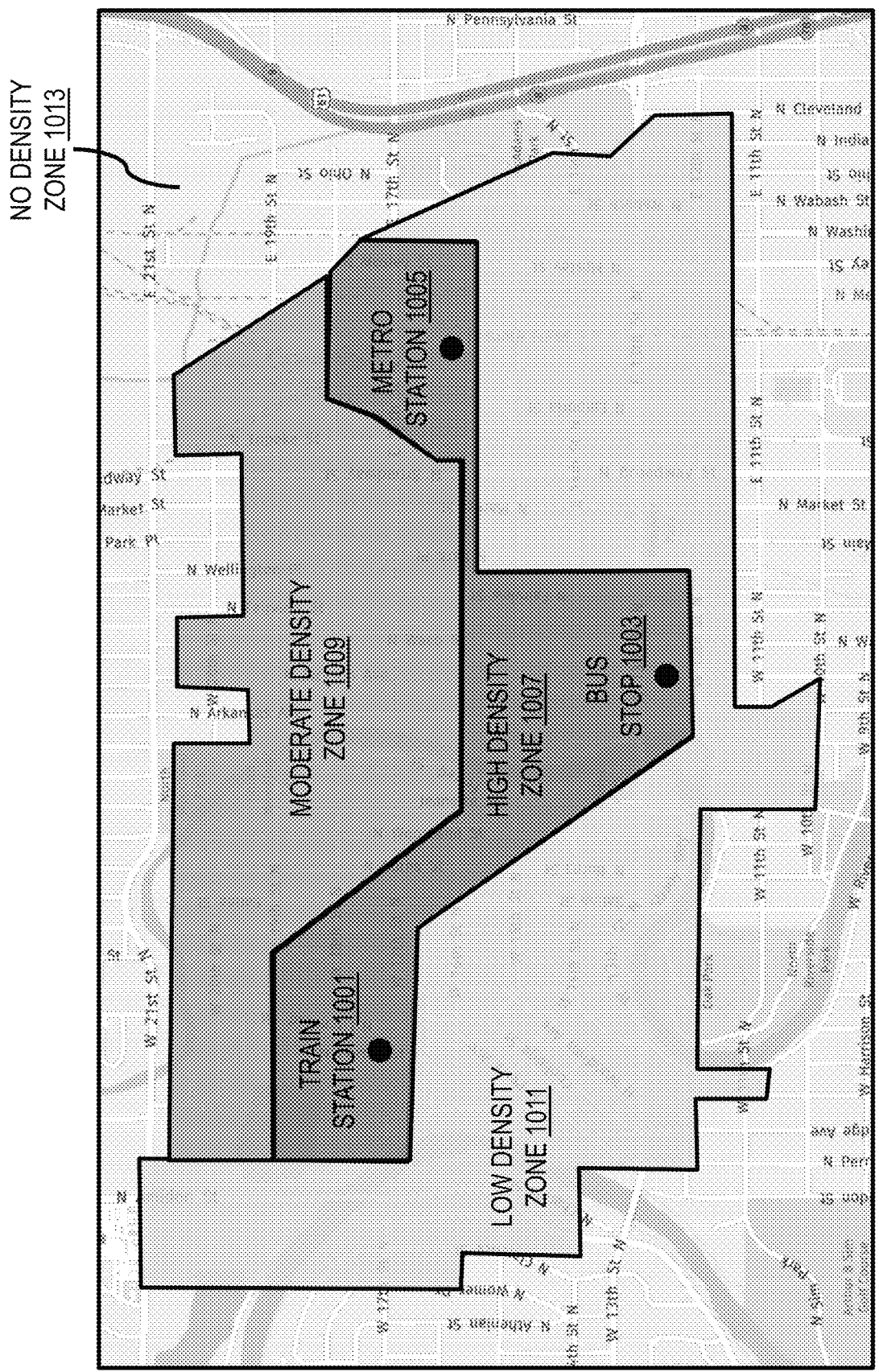
FIG. 10 is diagram illustrating a density heat map over multiple stops of a transportation system, according to example embodiment(s)

FIG. 10 visualizes an example of an area with an origin heat map over three different public transportation stops: a train station 1001, a bus stop 1003, and a metro station 1005. The origin densities in this example are calculated using origins of pedestrian OD patterns (e.g., OD data 111), whose destinations are either one of the three stops 1001-1005. This results in three heat map zones: high density zone 1007 near stations 1001-1005, medium density zone 1009 farther from stations 1001-1005, low density zone 1011 even farther from stations 1001-1005, and no density zone 1013 farthest from stations 1001-1005.

Similar to FIG. 6 and FIG. 7 respectively, the OD module 305 can construct distance-based and/or travel-time based zones around each station 1001-1005. This would create a short distance and medium distance zone for each station 1001-1005. Then, these short- and medium distance zones are overlaid with the heat map in FIG. 10 (e.g., similar to FIG. 8 and FIG. 9). The result is again zones labeled as different combinations of high/medium/low density-short/medium distance zones. In one embodiment, the OD module 305 then prioritizes locations using heuristics similar to the previous section and recommends possibly multiple optimum locations for ridesharing stations, wait zones, and/or other recommended locations/resource allocations.

Returning to FIG. 1, in one embodiment, the mapping platform 113 of system 100 has access to the probe database 127 for storing the pedestrian probe data 109 and/or the resulting OD data 111 and ridesharing service recommendations 119. In one embodiment, the mapping platform 113 also has connectivity to a geographic database 129 to provide location-based services based on the pedestrian probe data 109 and/or resulting OD data 111 and ridesharing service recommendations 119. The mapping platform 113 can operate, for instance, in connection with probe devices 101 such as but not limited to one or more UEs 105 (e.g., mobile devices) that can be carried by a user as a pedestrian 103. The UE 105 may be any pedestrian carriable device including but not limited to a personal navigation device ("PND"), a cellular telephone, a mobile phone, a personal digital assistant ("PDA"), a watch, a camera, a computer and/or any other device that supports location-based services, e.g., digital routing and map display. Also, the UE 105 may be configured to access the communication network 131 by way of any known or still developing communication protocols to transmit and/or receive pedestrian probe data 109 and/or resulting OD data 111 and ridesharing service recommendations 119.

Also, the UE 105 may be configured with an application 107 for collecting pedestrian probe data 109 (e.g., trajectories) and/or for interacting with one or more content providers 125, services platform 121, services 123, or a combination thereof. The application 107 may be any type of application that is executable on the UE 105, such as mapping applications, location-based service applications, navigation applications, content provisioning services, camera/imaging applications, media player applications, social networking applications, calendar applications, and the like. In one embodiment, the application 107 may act as a client for the mapping platform 113 and perform one or more functions of the mapping platform 113 alone or in combination with the mapping platform 113. In yet another embodiment, the content providers 125, services 123, and/or services platform 121 receive the resulting OD data 111 and ridesharing service recommendations 119 generated by the mapping platform 113 for executing its functions and/or services.

The UE 105 may be configured with various sensors (not shown for illustrative convenience) for acquiring and/or generating pedestrian probe data 109 and related information. For example, sensors may include GNSS/GPS receivers for interacting with one or more navigation satellites to determine and track the current speed, position and location of a vehicle travelling along a roadway. In addition, the sensors may gather motion data, light data, sound data, image data, weather data, temporal data and other data associated with the UEs 105. Still further, the sensors may detect local or transient network and/or wireless signals, such as those transmitted by nearby devices during travel by the pedestrian 103 (e.g., Li-Fi, near field communication (NFC), etc.). This may include, for example, network routers configured within a premise (e.g., home or business), another UE 105 or other communications-capable systems (e.g., traffic lights, traffic cameras, traffic signals, digital signage, etc.).

It is noted therefore that the above described data may be transmitted via communication network 131 as pedestrian probe data 109 according to any known wireless communication protocols. For example, each UE 105, mobile application 107, and/or user thereof may be assigned a unique probe identifier (probe ID) or pseudonym for use in reporting or transmitting said pedestrian probe data 109 collected by the UEs 105. In one embodiment, each UE 105 is configured to report pedestrian probe data 109 as probe points, which are individual data records collected at a point in time that records location data. Probes or probe points can be collected by the system 100 from the UEs 105, applications 107, and/or other equivalent probe devices 101 in real-time, in batches, continuously, or at any other frequency requested by the system 100 over, for instance, the communication network 131 for processing by the mapping platform 113.

In one embodiment, the mapping platform 113 retrieves pedestrian probe points gathered and/or generated by UE 105 resulting from the travel of UEs 105. The probe database 127 stores a plurality of probe points and/or trajectories (e.g., pedestrian probe data 109) generated by different UEs 105, applications 107, and/or other probe devices 101 over a period of time. A time sequence of probe points specifies a trajectory—i.e., a path traversed by a UE 105, application 107, other probe device 101, etc. over a period of time.

In one embodiment, the communication network 131 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 113 may be a platform with multiple interconnected components. The mapping platform 113 may include multiple servers, intelligent networking devices, computing devices, components, and corresponding software for minding pedestrian and/or vehicle specific probe data from mix-mode probe data. In addition, it is noted that the mapping platform 113 may be a separate entity of the system 100, a part of the one or more services 123 of the services platform 121, or included within the UE 105 (e.g., as part of the applications 107).

In one embodiment, the content providers 125 may provide content or data (e.g., probe data) to the components of the system 100. The content provided may be any type of content, such as probe data (e.g., pedestrian probe data 109), location data, textual content, audio content, video content, image content, etc. In one embodiment, the content providers 125 may also store content associated with the UEs 105, the mapping platform 113, and/or the services 123. In another embodiment, the content providers 125 may manage access to a central repository of data, and offer a consistent, standard interface to data, such as a trajectories database, a repository of pedestrian probe data 109 and related travel routes. Any known or still developing methods, techniques, or processes for retrieving and/or accessing trajectory or probe data from one or more sources may be employed by the mapping platform 113.

By way of example, the UE 105, application 107, other probe devices 101, and mapping platform 113 communicate with each other and other components of the system 100 using well known, new or still developing protocols. In this context, a protocol includes a set of rules defining how the network nodes within the communication network 131 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
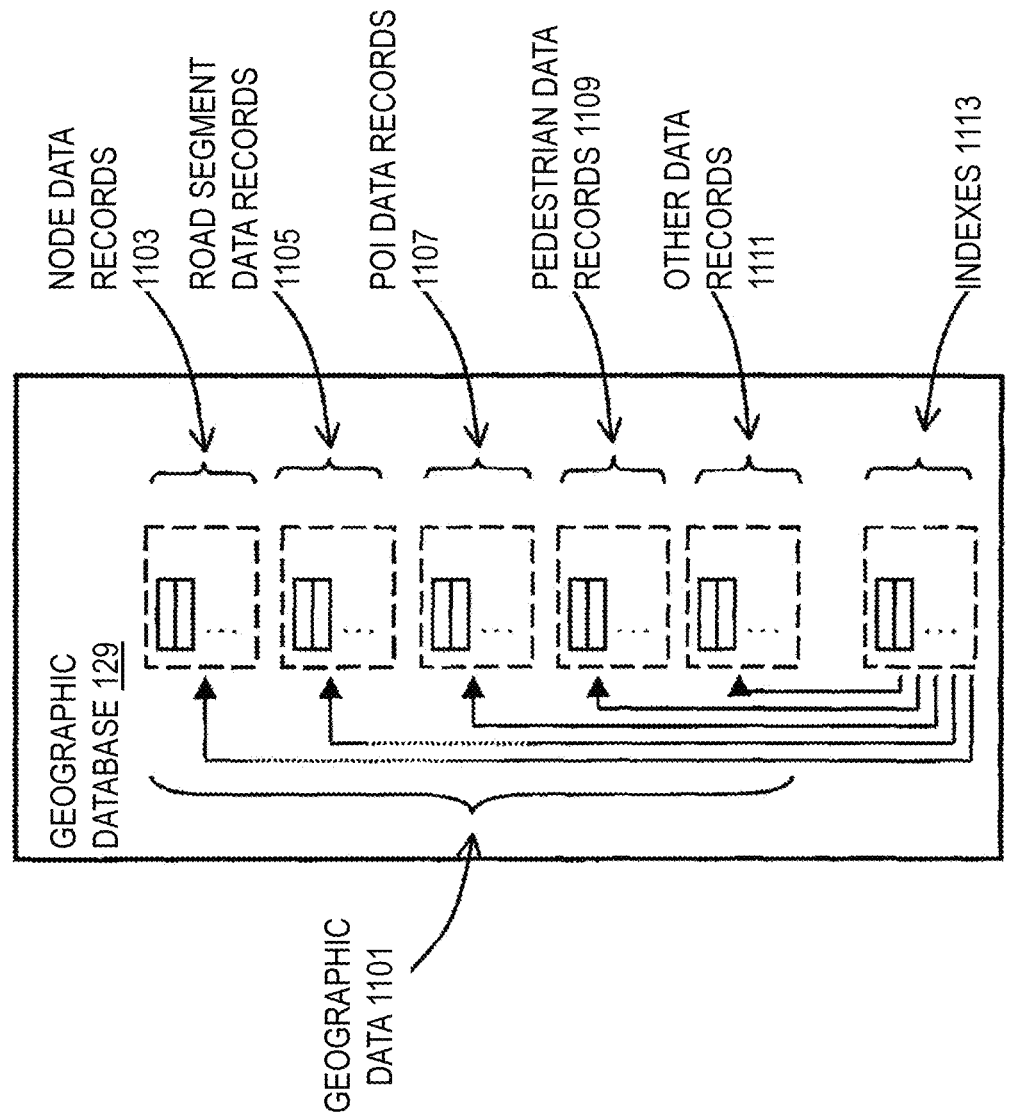
FIG. 11 is a diagram of geographic database, according to one embodiment.

FIG. 11 is a diagram of the geographic database 129 of system 100, according to exemplary embodiments. In the exemplary embodiments, modal routes, trajectories (sequences of probe points), road segments, lane model information and/or other related information can be stored, associated with, and/or linked to the geographic database 129 or data thereof. In one embodiment, the geographic database 129 includes geographic data 1101 used for (or configured to be compiled to be used for) mapping and/or navigation-related services, such as for personalized route determination, according to exemplary embodiments. For example, the geographic database 129 includes node data records 1103, road segment or link data records 1105, POI data records 1107, pedestrian data records 1109, and other data records 1111. More, fewer, or different data records can be provided. In one embodiment, the other data records (not shown) can include cartographic ("carto") data records, routing data, and maneuver data. One or more portions, components, areas, layers, features, text, and/or symbols of the POI or event data can be stored in, linked to, and/or associated with one or more of these data records. For example, one or more portions of the trajectories or modal routes can be matched with respective map or geographic records via position or GPS data associations (such as using known or future map matching or geo-coding techniques).

In exemplary embodiments, the road segment data records 1105 are links or segments representing roads, streets, or paths, as can be used in the calculated route or recorded route information for determination of one or more personalized routes, according to exemplary embodiments. The node data records 1103 are end points corresponding to the respective links or segments of the road segment data records 1105. The road link data records 1105 and the node data records 1103 represent a road network, such as used by vehicles, cars, and/or other entities. Alternatively, the geographic database 129 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 129 can include data about the POIs and their respective locations in the POI data records 1107. The geographic database 129 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In addition, the geographic database 129 can include pedestrian data records 1109 for storing pedestrian probe data 109, OD data 111, ridesharing service recommendations 119, and/or any other related data used in the embodiments described herein.

The geographic database 129 can be maintained by the content provider 125 in association with the services platform 121 (e.g., a map developer). The map developer can collect geographic data to generate and enhance the geographic database 129. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 129 can be a master geographic database stored in a format that facilitates updating, maintenance, and development. For example, the master geographic database 129 or data in the master geographic database 129 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 105. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 129 can be a master geographic database, but in alternate embodiments, the geographic database 129 can represent a compiled navigation database that can be used in or with end user devices (e.g., probe device 101, UE 105, etc.) to provide navigation-related functions (e.g., functions based on resulting OD data 111 and ridesharing service recommendations 119). For example, the geographic database 129 can be used with the end user device to provide an end user with navigation features. In such a case, the geographic database 129 can be downloaded or stored on the end user device (e.g., probe device 101, UE 105, etc.), such as in application 107, or the end user device can access the geographic database 129 through a wireless or wired connection (such as via a server and/or the communication network 131), for example.

The processes described herein for using pedestrian data for ridesharing services may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
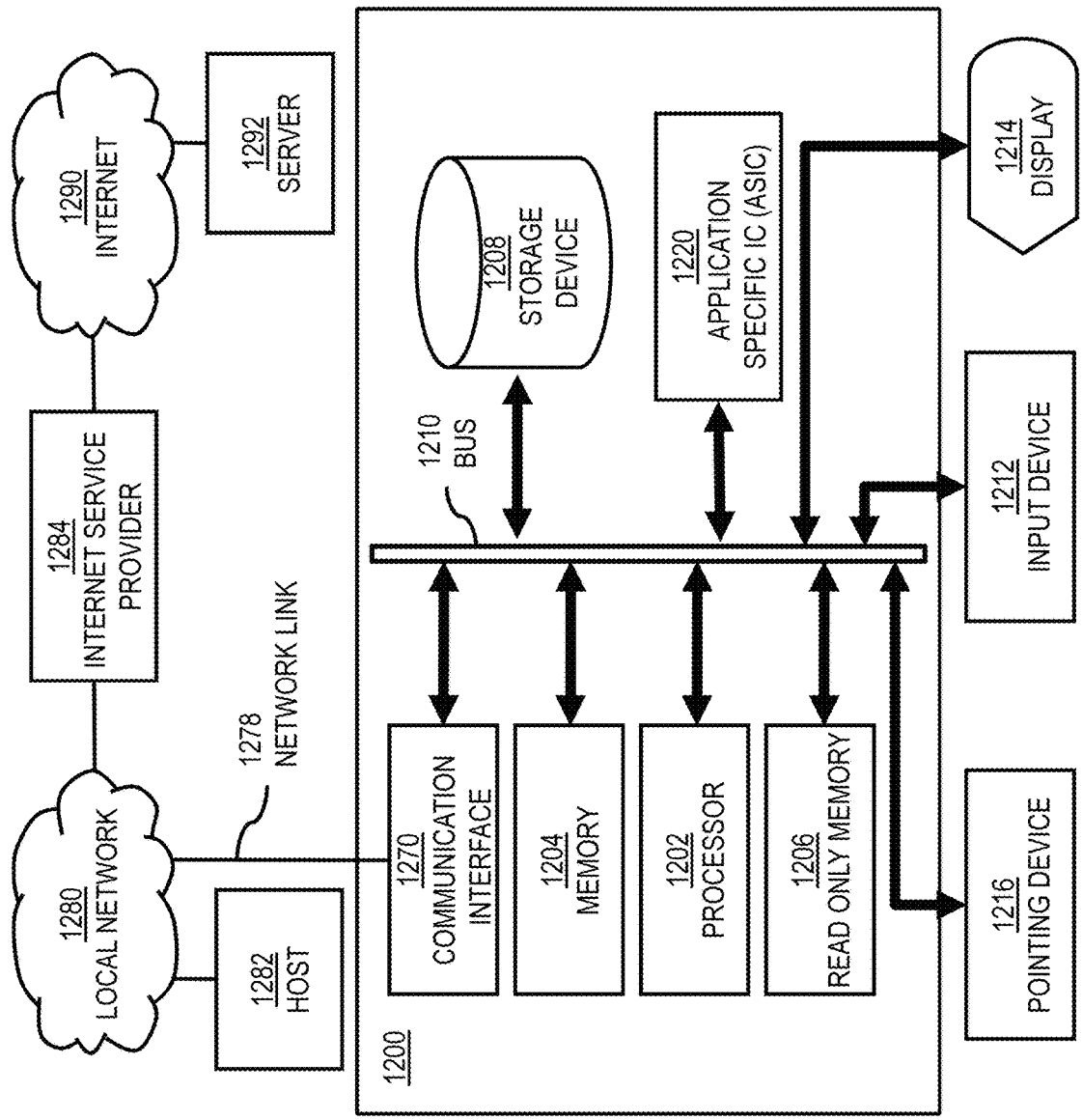
FIG. 12 is a diagram of hardware that can be used to implement an embodiment.

FIG. 12 illustrates a computer system 1200 upon which an embodiment of the invention may be implemented. Computer system 1200 is programmed (e.g., via computer program code or instructions) to use pedestrian data for ridesharing services as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to using pedestrian data for ridesharing services. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for using pedestrian data for ridesharing services. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for using pedestrian data for ridesharing services, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general, the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 131 for using pedestrian data for ridesharing services.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system can be deployed in various configurations within other computer systems, e.g., host 1282 and server 1292.

FIG. 13 illustrates a chip set 1300 upon which an embodiment of the invention may be implemented. Chip set 1300 is programmed to use pedestrian data for ridesharing services as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a base-board) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to use pedestrian data for ridesharing services. The memory 1305 also stores the data associated with or generated by the execution of the inventive steps.

Figure 14:
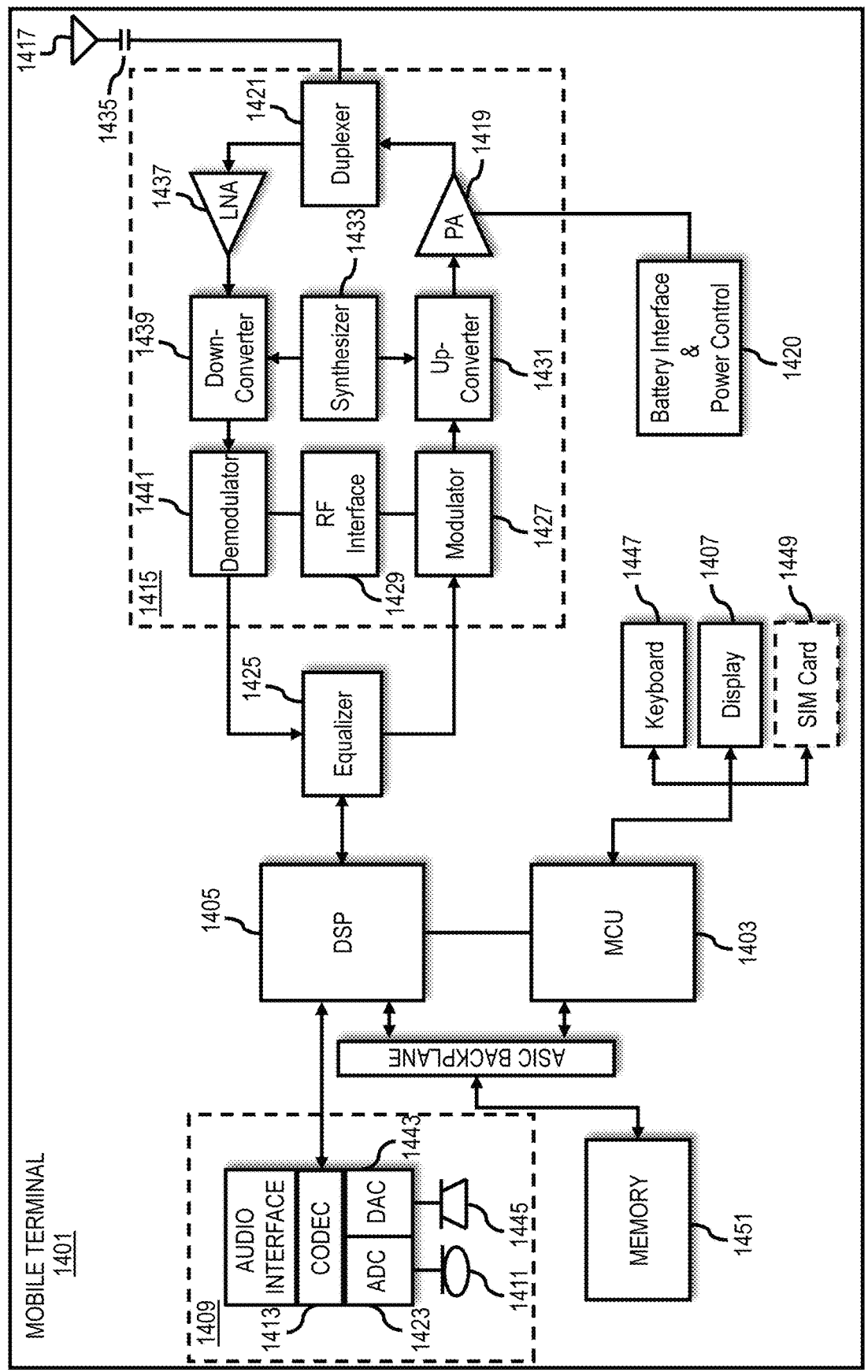
FIG. 14 is a diagram of a mobile terminal that can be used to implement an embodiment.

FIG. 14 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to use pedestrian data for ridesharing services. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving pedestrian probe data from a search zone associated with a designated location, wherein the pedestrian probe data is collected from one or more location sensors of at least one device associated with at least one pedestrian;
   processing the pedestrian probe data to determine one or more pedestrian paths terminating at the designated location;
   constructing an origin-destination matrix from the one or more pedestrian paths, wherein the origin-destination matrix represents a respective origin and a respective destination of each path of the one or more pedestrian paths and a number of times that each respective origin and each respective destination is observed in the pedestrian probe data;
   visualizing a heat map of the search zone in a user interface of a device, wherein the heat map is based on a density of origins in the search zone, wherein the origins in the search zone are the respective origins included in the origin-destination matrix that are located in the search zone;
   overlaying the heat map in the user interface of the device with one or more distance or travel-time based zones based on a designated location selected from each respective origin, each respective destination, or a combination thereof, wherein the user interface differentiates each respective origin and each respective from the designated location based on the one or more distance or travel-time based zones, wherein the overlay is automatically adjusted based on position data feedback from the user device;
   identifying at least one common origin, at least one common destination, or a combination thereof of the one or more pedestrian paths based on the heat map overlaid with the one or more distance or travel-time based zones;
   providing the at least one common origin, the at least one common destination, or a combination thereof as an output;
   modifying, via a processor, at least one device user interface element of the user interface of the device to visualize the at least one common origin, the at least one common destination, or a combination thereof based on the output.

2. The method of claim 1, wherein the output is provided to a ridesharing service for determining one or more ridesharing locations, one or more ridesharing resource allocations, or a combination thereof.

3. The method of claim 2, further comprising:
   recommending a change in the ridesharing service at the one or more ridesharing locations.

4. The method of claim 3, wherein the change includes installing a ridesharing station at the one or more ridesharing locations, allocating additional ridesharing resources within a threshold proximity of the one or more ridesharing locations, installing a ridesharing station at the designated location to serve the one or more ridesharing locations, or a combination thereof.

5. The method of claim 1, wherein the at least one common origin is further determined based on an origin density criterion in the search zone.

6. The method of claim 1, wherein the designated location is a transportation stop.

7. The method of claim 1, wherein the designated location is queried as a point of interest from digital map data.

8. An apparatus comprising:
   at least one processor; and
   at least one memory including computer program code for one or more programs, the at least one memory and the computer program code configured to, with the at least one processor, cause the apparatus to perform at least the following:
   receive pedestrian probe data from a search zone associated with a designated location, wherein the pedestrian probe data is collected from one or more location sensors of at least one device associated with at least one pedestrian;
   process the pedestrian probe data to determine one or more pedestrian paths terminating at the designated location;
   construct an origin-destination matrix from the one or more pedestrian paths, wherein the origin-destination matrix represents a respective origin and a respective destination of each path of the one or more pedestrian paths and a number of times that each respective origin and each respective destination is observed in the pedestrian probe data;
   visualize a heat map of the search zone in a user interface of a device, wherein the heat map is based on a density of origins in the search zone, wherein the origins In the search zone are the respective origins included in the origin-destination matrix that are located in the search zone;

overlay the heat map in the user interface of the device with one or more distance or travel-time based zones based on a designated location selected from each respective origin, each respective destination, or a combination thereof, wherein the user interface differentiates each respective origin and each respective from the designated location based on the one or more distance or travel-time based zones, wherein the overlay is automatically adjusted based on position data feedback from the user device;

identify at least one common origin, at least one common destination, or a combination thereof of the one or more pedestrian paths based on the heat map overlaid with the one or more distance or travel-time based zones;

provide the at least one common origin, the at least one common destination, or a combination thereof as an output;

modify via a processor, at least one device user interface element of the user interface of the device to visualize the at least one common origin, the at least one common destination, or a combination thereof based on the output.

9. The apparatus of claim 8, wherein the output is provided to a ridesharing service for determining one or more ridesharing locations, one or more ridesharing resource allocations, or a combination thereof.

10. The apparatus of claim 9, wherein the apparatus is further caused to:
recommend a change in the ridesharing service at the one or more ridesharing locations.

11. The apparatus of claim 10, wherein the change includes installing a ridesharing station at the one or more ridesharing locations, allocating additional ridesharing resources within a threshold proximity of the one or more ridesharing locations, installing a ridesharing station at the designated location to serve the one or more ridesharing locations, or a combination thereof.

12. A non-transitory computer readable storage medium including one or more sequences of one or more instructions which, when executed by one or more processors, cause an apparatus to at least perform:

receiving pedestrian probe data from a search zone associated with a designated location, wherein the pedestrian probe data is collected from one or more location sensors of at least one device associated with at least one pedestrian;

processing the pedestrian probe data to determine one or more pedestrian paths terminating at the designated location;

constructing an origin-destination matrix from the one or more pedestrian paths, wherein the origin-destination matrix represents a respective origin and a respective destination of each path of the one or more pedestrian paths and a number of times that each respective origin and each respective destination is observed in the pedestrian probe data;

visualizing a heat map of the search zone in a user interface of a device, wherein the heat map is based on a density of origins in the search zone, wherein the origins In the search zone are the respective origins included in the origin-destination matrix that are located in the search zone;

overlaying the heat map in the user interface of the device with one or more distance or travel-time based zones based on a designated location selected from each respective origin, each respective destination, or a combination thereof, wherein the user interface differentiates each respective origin and each respective from the designated location based on the one or more distance or travel-time based zones, wherein the overlay is automatically adjusted based on position data feedback from the user device;

identifying at least one common origin, at least one common destination, or a combination thereof of the one or more pedestrian paths based on the heat map overlaid with the one or more distance or travel-time based zones;

providing the at least one common origin, the at least one common destination, or a combination thereof as an output;

modifying, via a processor, at least one device user interface element of the user interface of the device to visualize the at least one common origin, the at least one common destination, or a combination thereof based on the output.

13. The non-transitory computer readable storage medium of claim 12, wherein the output is provided to a ridesharing service for determining one or more ridesharing locations, one or more ridesharing resource allocations, or a combination thereof.

14. The non-transitory computer readable storage medium of claim 13, wherein the apparatus is caused to further perform:
recommending a change in the ridesharing service at the one or more ridesharing locations.

15. The non-transitory computer readable storage medium of claim 14, wherein the change includes installing a ridesharing station at the one or more ridesharing locations, allocating additional ridesharing resources within a threshold proximity of the one or more ridesharing locations, installing a ridesharing station at the designated location to serve the one or more ridesharing locations, or a combination thereof.

* * * * *